US007727385B2

(12) United States Patent
Siy et al.

(10) Patent No.: US 7,727,385 B2
(45) Date of Patent: Jun. 1, 2010

(54) ENHANCED BITUMEN FLOTATION

(75) Inventors: Robert Siy, Edmonton (CA); Jonathan Spence, Edmonton (CA); Owen Neiman, Fort McMurray (CA)

(73) Assignee: Syncrude Canada Ltd., Fort McMurray (CA)

( * ) Notice: Subject to any disclaimer, the term of this patent is extended or adjusted under 35 U.S.C. 154(b) by 196 days.

(21) Appl. No.: 11/673,479

(22) Filed: Feb. 9, 2007

(65) Prior Publication Data

US 2008/0190817 A1 Aug. 14, 2008

(51) Int. Cl.
*B01D 11/02* (2006.01)

(52) U.S. Cl. ....................... 208/390; 208/391; 209/162; 209/163; 209/164; 209/171

(58) Field of Classification Search ................. 209/4-5, 209/132, 155, 162-165, 168, 171; 208/390-391
See application file for complete search history.

(56) References Cited

U.S. PATENT DOCUMENTS 4,545,892 A 10/1985 Cymbalisty et al.
4,968,413 A * 11/1990 Datta et al. ................. 208/390
5,332,100 A * 7/1994 Jameson ..................... 209/164

FOREIGN PATENT DOCUMENTS

| | | |
|---|---|---|
| CA | 1248476 | 1/1989 |
| CA | 2015784 | 10/1991 |
| CA | 1329277 | 5/1994 |
| CA | 2217623 | 4/1999 |

OTHER PUBLICATIONS

Cowburn, J. et al., Design Developments of the Jameson Cell, Centenary of Flotation 2005 Symposium, Brisbane, Jun. 5-9, 2005.

* cited by examiner

*Primary Examiner*—Robert J Hill, Jr.
*Assistant Examiner*—Brian McCaig
(74) *Attorney, Agent, or Firm*—Bennett Jones LLP

(57) ABSTRACT

A method and apparatus for recovering bitumen as froth from a feed stream having solids, water and bitumen is provided using a separating vessel having mounted thereon a downpipe assembly, the downpipe assembly having at least one downpipe and a nozzle in fluid communication with each downpipe, for aerating a stream of middlings withdrawn from the separating vessel and reintroducing the aerated middlings back to the separating vessel.

8 Claims, 5 Drawing Sheets

ENHANCED BITUMEN FLOTATION

FIELD OF THE INVENTION

The present invention relates to a method and apparatus for recovering bitumen from a feed stream having solids, water and bitumen. More particularly, it relates to the use of a separating vessel having mounted thereon a downpipe assembly comprising at least one downpipe and a nozzle in fluid communication with each downpipe for aerating a stream of middlings withdrawn from the separating vessel.

BACKGROUND OF THE INVENTION

Oil sand, such as is mined in the Fort McMurray region of Alberta, generally comprises water-wet sand grains held together by a matrix of viscous bitumen. It lends itself to liberation of the sand grains from the bitumen, preferably by slurrying the oil sand in hot process water, allowing the bitumen to move to the aqueous phase.

For many years, the bitumen in the McMurray sand has been commercially removed from oil sand using what is commonly referred to in the industry as the "hot water process". In general terms, the hot water process involves the following steps:

- dry mining the oil sand at a mine site that can be kilometers from an extraction plant;
- conveying the as-mined oil sand on conveyer belts to the extraction plant;
- feeding the oil sand into a rotating tumbler where it is mixed for a prescribed retention time (generally in the range of 2 to 4 minutes) with hot water (approximately 80-90° C.), steam, caustic (e.g., sodium hydroxide) and naturally entrained air to yield a slurry that has a temperature typically around 80° C. The bitumen matrix is heated and becomes less viscous. Chunks of oil sand are ablated or disintegrated. The released sand grains and separated bitumen flecks are dispersed in the water. To some extent bitumen flecks coalesce and grow in size. They may contact air bubbles and coat them to become aerated bitumen. The term used to describe this overall process in the tumbler is "conditioning"; and
- diluting the slurry so produced with additional hot water to produce a diluted slurry having a temperature of about 65° C. to about 80° C. The diluted slurry is introduced into a large, open-topped, conical-bottomed, cylindrical vessel termed a primary separation vessel (PSV) where the more buoyant aerated bitumen rises to the surface and forms a froth layer. This froth layer overflows the top lip of the PSV and is received in a launder extending around the PSV's rim. The product is commonly called "primary froth" and typically has a temperature of about 65° C. to about 75° C.

Throughout the years, the hot water process has been modified to be more energy efficient by reducing the process temperature and replacing short-duration, high-temperature conditioning in a tumbler with longer-duration, lower-temperature conditioning in a hydrotransport pipeline. A "warm slurry extraction process" was developed in the early 1990s and is disclosed in Canadian Patent No. 2,015,784. In the late 1990s, a cold dense slurrying process for extracting bitumen from oil sand was developed, which is disclosed in Canadian patent No. 2,217,623. This process is commonly referred to as the "low energy extraction process" or the "LEE process".

All of the above extraction processes use a PSV for receiving diluted oil sand slurry and separating the aerated or floating bitumen from the sand. The typical residence time in the PSV is approximately 45 minutes. During this time, the sand sinks and is concentrated in the bottom section of the PSV where it is removed as tailings underflow (also referred to herein as "PSV tailings"). Some valuable bitumen is lost to this underflow. Further, a portion of the non-aerated (i.e., non-floating) bitumen remains in the watery mid-section of the PSV, together with dispersed fine solids. This watery suspension is referred to in the industry as "middlings" and in the present invention will also be referred to as "PSV middlings".

To improve overall bitumen recovery, it is important to capture both the floating and non-floating bitumen that still remains in the middlings and tailings underflow. One way for recovering bitumen from PSV tailings and middlings is described in Canadian Patent No. 1,248,476 and U.S. Pat. No. 4,545,892. In these patents, the PSV tailings and middlings are combined and introduced into a second separation vessel referred to as the tailings oil recovery vessel ("TORV"). Briefly stated, the incoming feed to the vessel is deflected and spread out laterally and contacted from below by an upwelling stream of aerated and recycled TORV middlings. The air bubbles in the recycled TORV middlings contact and aerate previously non-buoyant bitumen in the feed to produce "secondary" bitumen froth.

More particularly, a plenum assembly is positioned inside the TORV, centrally of the chamber of the TORV, in the body of the TORV middlings. The plenum assembly comprises a plurality of eductor/aerator devices, each eductor/aerator device comprising a nozzle and a venturi tube, the nozzle being positioned close to but gapped from the venturi tube. Each eductor/aerator device extends outwardly from the plenum assembly lower wall, being connected to the lower wall by the venturi tube. Finally, each nozzle is circumscribed by a tubular sparger mounted thereon.

The recycled TORV middlings are upwardly fed at a high velocity into the nozzles of the eductor/aerator assemblies in order to entrain additional middlings present in the TORV. Pressurized air is fed to the tubular sparger to aerate the recycled middlings feed. The aerated middlings exit the nozzle and are injected into the inlet of the venturi tube. The motive jet of recycled middlings induces a flow of non-aerated middlings from the TORV chamber through the gap formed between the nozzle and the venturi tube. The aerated middlings first collect in the plenum chamber and are then discharged outwardly, slightly upwardly, and generally radially from the plenum chamber through slot-like outlets.

In operation, however, there were several drawbacks to using the above-described plenum assembly. For example, the eductor/aerator devices would routinely become plugged with or damaged by the solids present in the recycled middlings. Further, the recycled middlings had to be fed at relatively high motive velocities in order to generate additional entrainment of middlings, which further contributed to the erosion damage to the eductor/aerator devices. Finally, because the plenum assembly was situated inside the TORV, the entire TORV operation had to be shut down and the plenum assembly removed whenever maintenance of the plenum assembly was required. The TORV would have to be drained to enable access to the normally submerged assembly, resulting in labor and repair costs as well as lost production.

The present invention addresses some of the problems associated with the plenum assembly by providing a gravity separation vessel having mounted thereto a downpipe assembly comprising at least one downpipe having a nozzle for aerating recycled middlings, which downpipe assembly does not need to be internally mounted. Thus, the downpipe assembly is easily accessible for maintenance without having to shut down the entire vessel operation.

SUMMARY OF THE INVENTION

In accordance with an aspect of the invention, a method for continuously recovering bitumen as froth from a feed stream having solids, water and bitumen is presented, including:

- delivering the feed stream into a separating vessel through a feedwell and allowing the feed stream to separate into an upper bitumen-rich zone, a middlings zone and a lower concentrated solids zone;
- providing a downpipe assembly comprising at least one downpipe having an upper end and an open lower end, said downpipe assembly mounted to the separation vessel such that each downpipe extends substantially vertically into the separation vessel and the open lower end of each downpipe extends below the bitumen-rich zone;
- removing a stream of middlings from the middlings zone of the separation vessel and introducing the middlings stream into the upper end of the downpipe by means of a nozzle positioned at or near the upper end of each downpipe to form a jet of middlings;
- introducing air into the middlings stream to produce aerated middlings and allowing the aerated middlings to issue from the open lower end of each downpipe below the bitumen-rich froth zone of the separation vessel; and
- continuously recovering the bitumen froth from the upper bitumen-rich zone and withdrawing the solids from the lower concentrated solids zone in the separation vessel.

The term "nozzle" in the present invention includes any device having a contracting, tapering tube or vent, an orifice plate, or the like, which can be used to accelerate the flow of a liquid.

In one embodiment, air is introduced into the middlings stream through an opening at or near the upper end of the downpipe. In another embodiment, air is introduced into the middlings stream prior to introducing the middlings into the nozzle.

The present method targets both the floating bitumen (i.e., aerated bitumen) and the non-floating bitumen present in a feed stream. Without being bound to theory, it would be expected that all floating bitumen present in a feed stream would be recovered in a separating vessel. However, this does not appear to be the case, likely due to mixing in the vessel and/or insufficient residence time. Thus, some of the floating bitumen still reports to the middlings zone. Further, a significant amount of the bitumen in the feed stream may be present as non-floating bitumen, likely due to the bitumen droplets being contaminated with solids or that the droplets are too small to promote aeration and flotation. Hence, non-floating bitumen may also be present in the middlings zone and in the lower solids layer. This non-floating bitumen requires more substantial shearing/conditioning and/or applied aeration to promote some portion of it to be floatable.

By way of example, it is estimated that somewhere between about 50 to about 80 percent of the bitumen remaining in the combined PSV middlings and PSV tailings is in the form of non-floating bitumen. Thus, successful capture of even a portion of this non-floating bitumen can significantly increase the overall bitumen recoveries from oil sand slurry. Hence, the present invention is directed towards increasing the recovery of non-floating bitumen present in a feed stream having solids, water and bitumen.

In one embodiment of the present invention, the separating vessel is a primary separation vessel (PSV), as known in the art, and the feed stream is diluted oil sand slurry. The downpipe assembly of the present invention is mounted to the PSV and the PSV middlings are continuously recycled back to the downpipe assembly to aerate a portion of the non-floating bitumen present therein. The aerated PSV middlings are thus introduced back into the PSV where the aerated bitumen will now have an opportunity to be recovered as primary froth. The continuous recycling of the PSV middlings also provides the floating bitumen present in the PSV middlings another opportunity to report to the bitumen-rich zone.

In another embodiment, the separating vessel of the present invention is a secondary separation vessel, for example, a tailings oil recovery vessel (TORV), as known in the art, and the feed stream is PSV middlings or combined PSV middlings and PSV tailings. In this embodiment, the downpipe assembly of the present invention is mounted to the TORV and the TORV middlings are continuously recycled back to the downpipe assembly, where a portion of the non-floating bitumen is aerated and then introduced back into the TORV. The aerated bitumen will now have an opportunity to be recovered as secondary or TORV froth. The continuous recycling of the TORV middlings also gives the floating bitumen present in the TORV middlings another opportunity to report to the bitumen froth layer.

In accordance with another aspect of the invention, an apparatus for continuously recovering bitumen as froth from a feed stream having solids, water and bitumen is presented, having:

- a separating vessel having a feedwell for receiving the feed stream, the separating vessel operative for separating the feed stream into an upper bitumen-rich zone, a middlings zone and a lower concentrated solids zone;
- a downpipe assembly having at least one downpipe with an upper end and an open lower end, said downpipe assembly mounted to the separation vessel such that each downpipe extends substantially vertically into the separation vessel and the open lower end of each downpipe extends below the bitumen-rich zone;
- a nozzle positioned at or near the upper end of each downpipe and in fluid communication with the downpipe;
- means for removing a stream of middlings from the middlings zone of the separating and introducing the stream of middlings into the nozzle; and
- an air supply means for introducing air into the stream of middlings and producing aerated middlings.

The downpipe assembly of the present invention can be readily maintained without interfering with the vessel operation, as it does not have to be mounted internally like the prior art plenum assembly. Further, each individual downpipe can be separately maintained or replaced without interfering with the operation of the other downpipes. Existing separation vessels can be easily retrofitted with a downpipe assembly of the present invention in order to practice the invention.

In addition, lower nozzle velocities are needed in the present invention. In the prior art plenum assembly, high nozzle velocities were needed in order to produce entrainment of additional middlings slurry into the venturis of the eductor/aerator devices. The recycled middlings flow through the nozzles was only about 3,000 USGPM. Thus, it was desirable to entrain several times that amount into the venturis for improved bitumen recoveries. In the present invention, however, entrainment of additional middlings is not necessary. The use of downwardly fed downpipes allows for direct pumping of higher volumes of recycled middlings through the nozzles, for example, up to about 14,000 USGPM. Hence, the recycled middlings can be fed at much lower velocities that the velocities needed when using the prior art eductor/ aerator assembly. Further, because the recycled middlings are fed downwardly through the downpipe, there is a lower air requirement needed to aerate the recycled middlings.

Lowering the feed velocity allows one to use nozzles having larger diameter openings or orifices. For example, in the previous prior art plenum assembly, the nozzles used had to have nozzle opening of about 3 inches in diameter to maintain a high enough velocity of about 25 meters/second. Since some of the largest solids present in the middlings could be close to 3 inches in diameter, the nozzles would regularly plug. In the present invention, however, the velocity needed is much lower and can be as low as about 5 to 10 meters/second, or lower. Thus, nozzles can be used in the present invention that have openings as large as 6 inches in diameter, or higher. Thus, the reduced velocity and larger diameter openings in the nozzles of the present invention ultimately leads to less plugging of the nozzles and less wear.

BRIEF DESCRIPTION OF THE DRAWINGS

The features and advantages of the invention will become more apparent from the following detailed description of the embodiment with reference to the attached diagrams wherein.

It will be noted that in the attached diagrams like features bear similar labels.

DETAILED DESCRIPTION OF THE EMBODIMENTS

The detailed description set forth below in connection with the appended drawings is intended as a description of various embodiments of the present invention and is not intended to represent the only embodiments contemplated by the inventors. The detailed description includes specific details for the purpose of providing a comprehensive understanding of the present invention. However, it will be apparent to those skilled in the art that the present invention may be practiced without these specific details.

Figure 1:
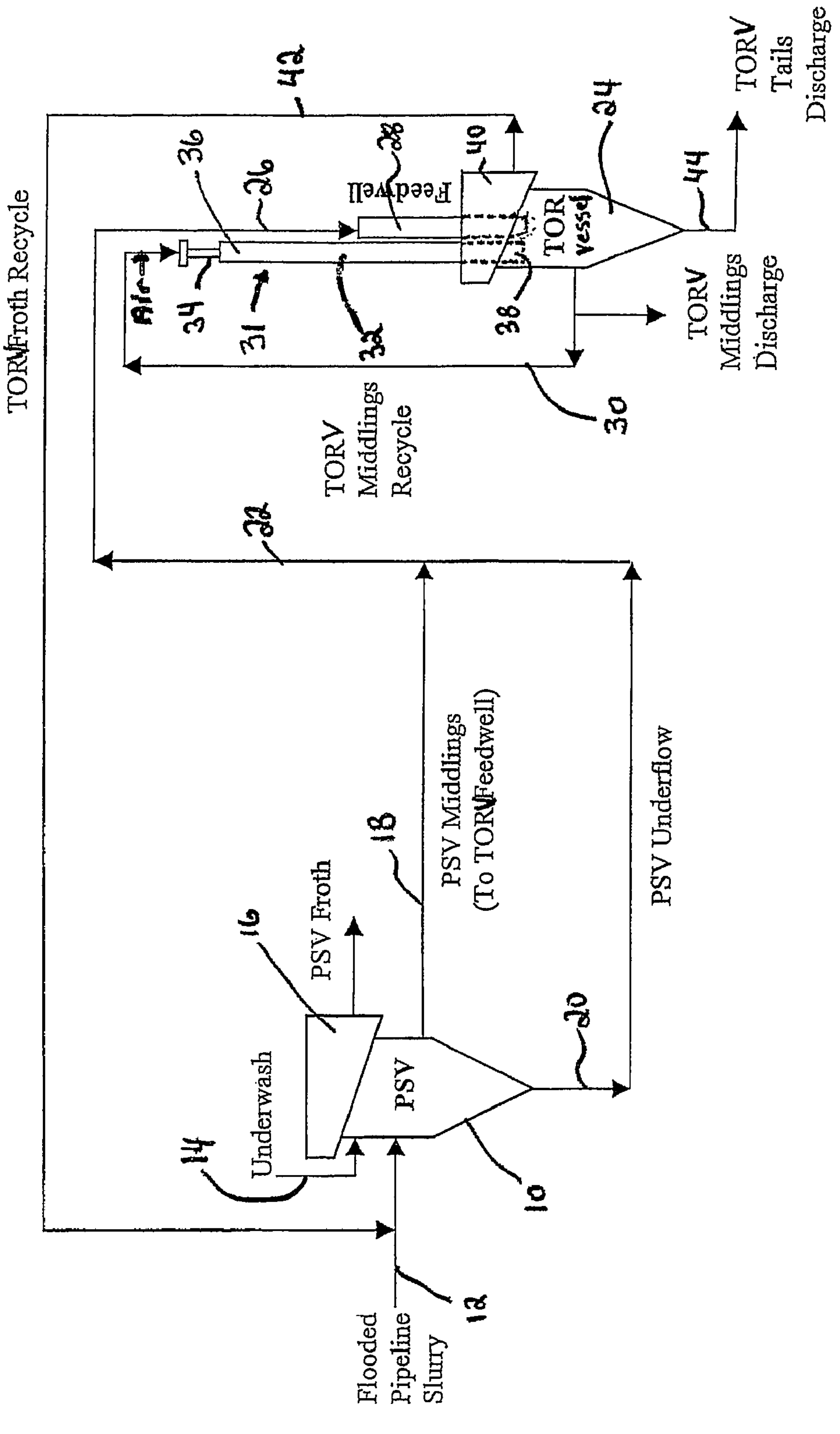
FIG. 1 is a schematic flowsheet showing one embodiment of the invention where the separating vessel used for recovering non-floating bitumen is a TORV and the feed stream is a combination of PSV middlings and PSV tailings.

An embodiment of the invention is shown in FIG. 1. In this embodiment, the feed stream is combined middlings and tailings obtained from a primary separation vessel (PSV) and the separating vessel comprising a downpipe assembly of the present invention is a tailings oil recovery vessel (TORV).

With reference to FIG. 1, diluted oil sand slurry is introduced into PSV 10 via feed line 12, where the diluted slurry is temporarily retained under quiescent conditions to produce an overflowing primary bitumen froth stream ("PSV froth"), a middlings stream recovered from the midsection of the PSV 10 ("PSV middlings"), and an underflow sand tailings stream ("PSV tailings"). In a preferred embodiment, an underwash of warm water is introduced via line 14 directly underneath the layer of primary bitumen froth.

Primary bitumen froth overflows into launder 16 and is collected for further upgrading. The PSV middlings and the PSV tailings are both pumped through withdrawal lines 18 and 20, respectively, and are combined into a single feed stream in feed line 22.

As previously mentioned, both the PSV middlings and the PSV tailings comprise a significant amount of bitumen. Typically, the portion of bitumen that is not recovered as primary bitumen froth is between about 2% to about 10% of the total bitumen present in the diluted oil sand slurry. A large portion of the remaining bitumen is present in the form of non-floating bitumen.

Figure 4:
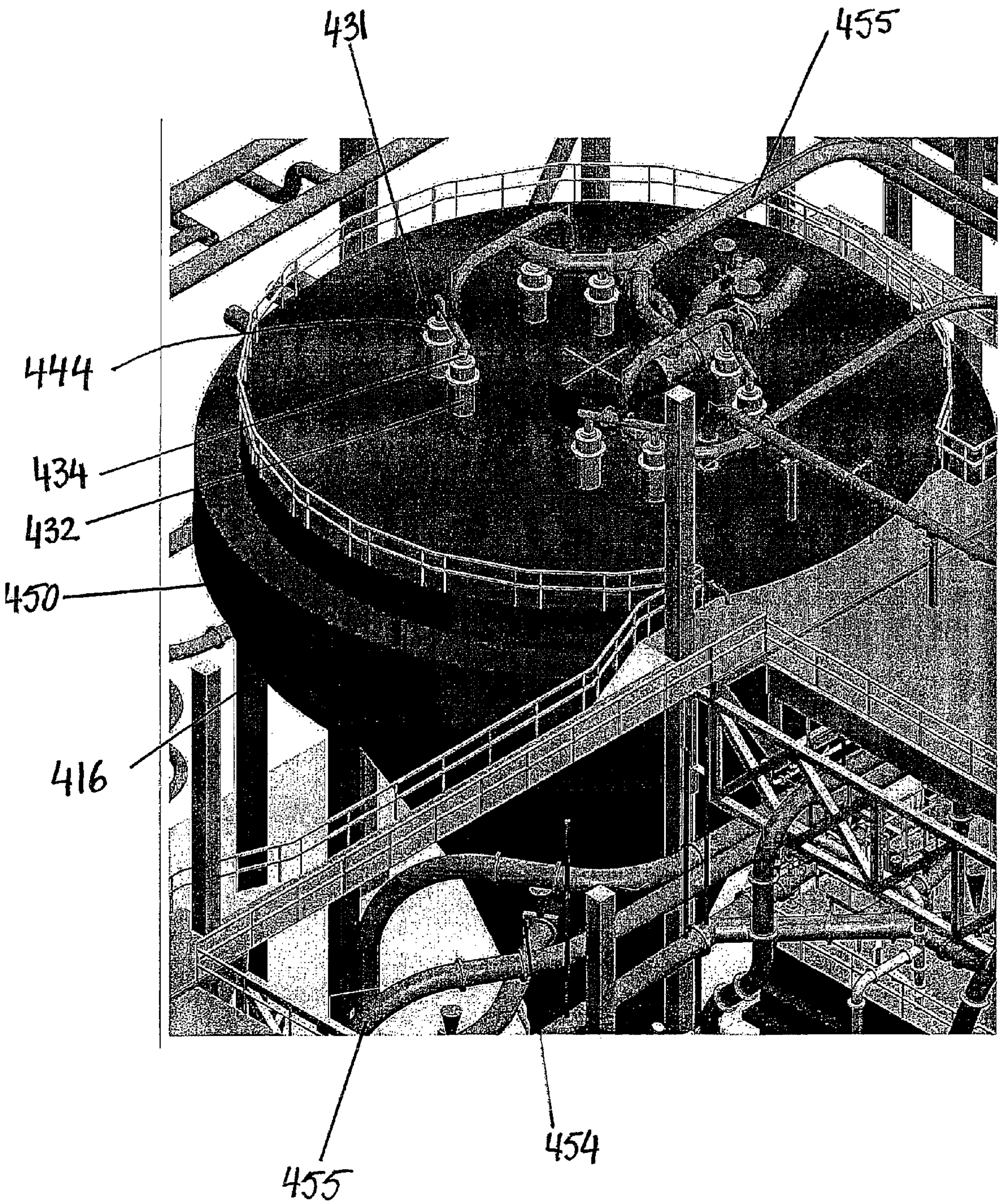
FIG. 4 is a perspective of a downpipe assembly comprising a plurality of downpipes mounted to a separation vessel that can be used to practice the present invention.

The feed stream of combined PSV middlings and PSV tailings is introduced into TORV 24 via feed line 26, which is connected to feedwell 28. It is understood that the PSV middlings and PSV tailings could also be fed to the feedwell via separate feed lines as shown in FIG. 4. The feed stream is temporarily retained in TORV 24 to produce an overflowing secondary bitumen froth stream ("TORV froth"), a middlings stream ("TORV middlings") and an underflow sand tailings stream ("TORV tailings"). A significant portion of the non-floating bitumen reports to the TORV middlings. Preferably, feedwell 28 extends into the TORV middlings layer, where the feed stream is introduced. However, it is understood that the feed stream can be introduced into the TORV 24 by other means known in the art.

Figure 5:
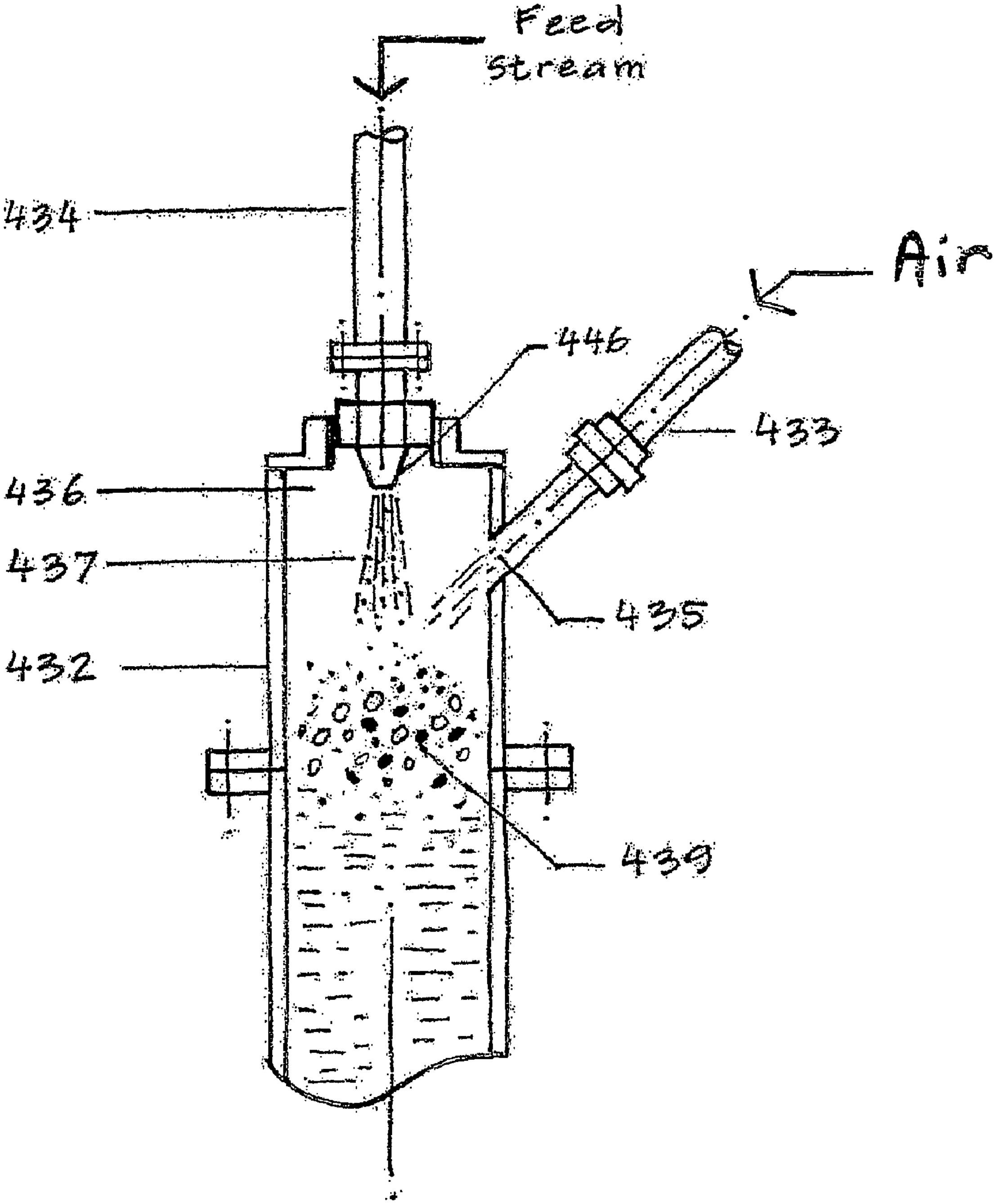
FIG. 5 is a cross-section of a downpipe that can be used to practice the present invention.

The TORV middlings, which contain both the floating and non-floating bitumen, are continuously removed via withdrawal line 30 and further aerated by means of downpipe assembly 31. Downpipe assembly 31 comprises at least one downpipe 32 and each downpipe 32 has a flow nozzle 34 located at or near the upper end 36 of downpipe 32. In this embodiment, flow nozzle 34 comprises a nozzle tube and an orifice plate. It is understood that a variety of different types of nozzles can be used to produce the middlings jet. In this embodiment, air is injected into the middlings stream prior to the middlings entering nozzle 34. In another embodiment, downpipe 32 further comprises at least one air inlet (as shown in FIG. 5) for entraining air. In yet a further embodiment, the upper end of the downpipe is not completely sealed around the nozzle, thereby allowing air to be drawn therethrough. Lower end 38 of downpipe 32 is open to TORV 24 and the aerated TORV middlings are introduced into the TORV middlings layer.

Overflowing TORV froth is collected in launder 40 and may be pumped back to PSV 10 via line 42. The TORV froth is typically first mixed with diluted oil sand slurry before being introduced into PSV 10. In the alternative, the TORV froth can be combined with PSV froth for further upgrading. TORV tailings are also continuously removed via line 44 to be either further treated or disposed in tailings disposal sites.

Figure 2:
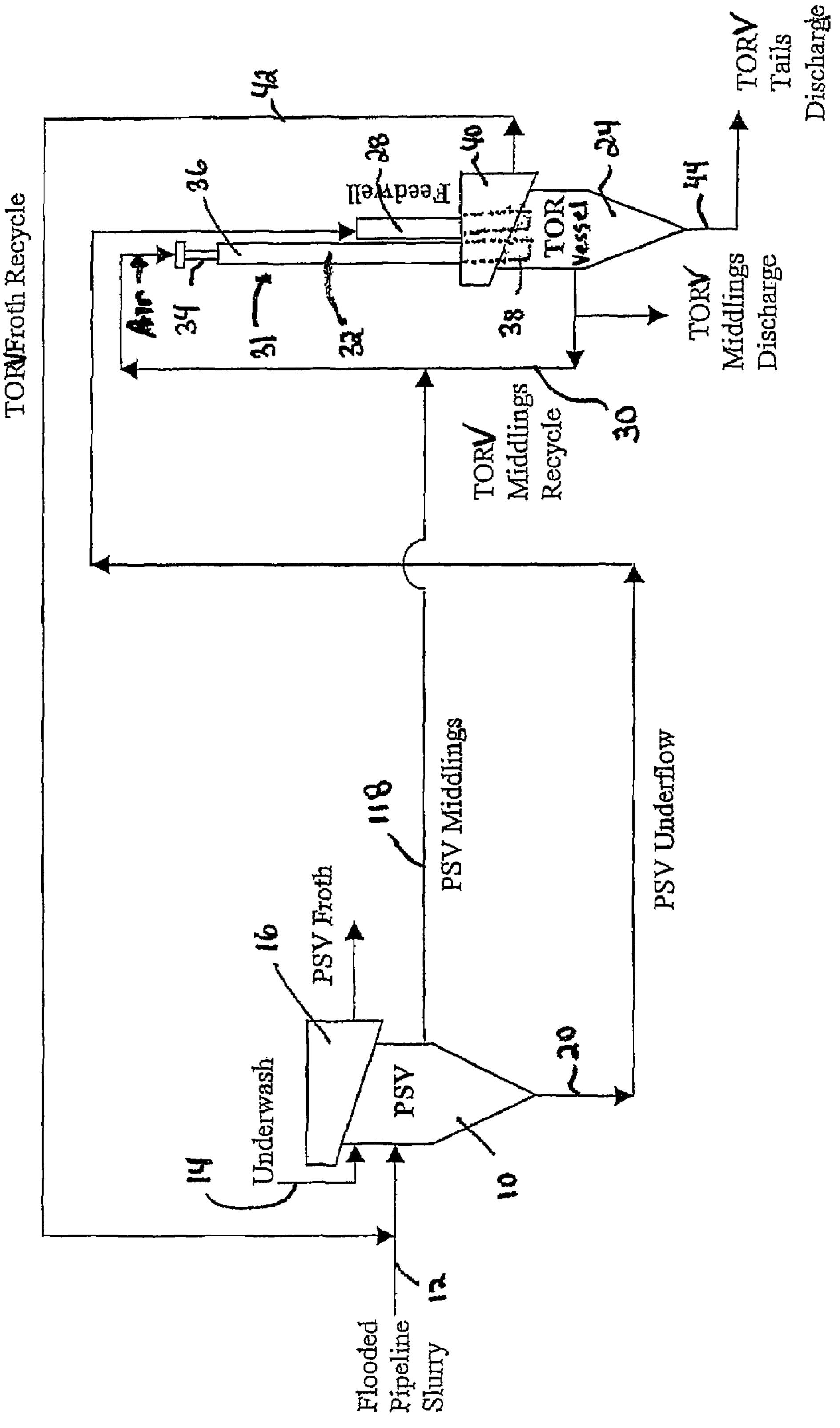
FIG. 2 is a schematic flowsheet showing one embodiment of the invention where the separating vessel used for recovering non-floating bitumen is a TORV and the feed stream is PSV tailings. In this embodiment, the PSV middlings are combined with the TORV middlings and aerated in the TORV downpipe assembly.

FIG. 2 shows another embodiment of the present invention. In this embodiment, the feed stream to the TORV 24 via feedwell 28 is PSV tailings only. The PSV middlings are removed via withdrawal line 118 and combined with TORV middlings and the combined PSV and TORV middlings are then fed to downpipe assembly 31 for aeration.

Figure 3:
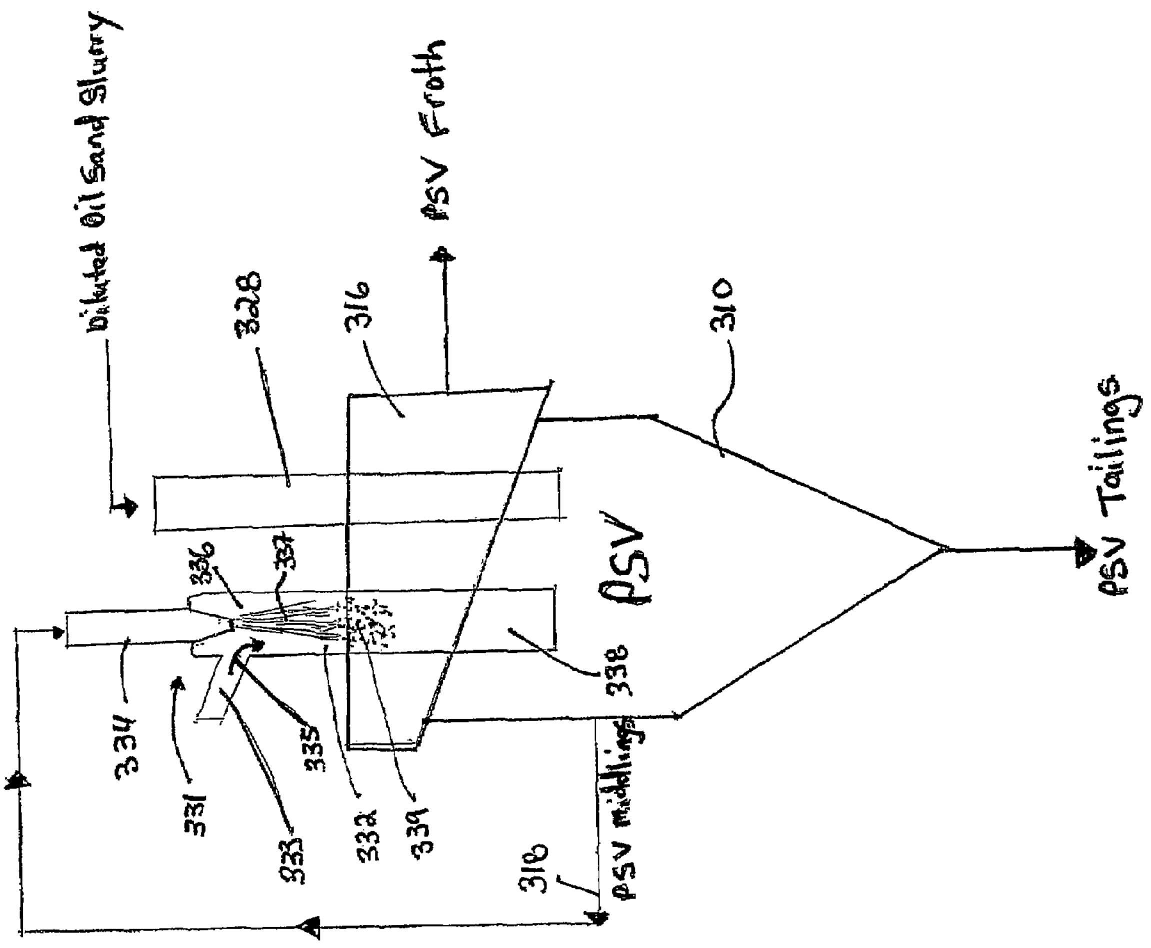
FIG. 3 is a schematic flowsheet showing one embodiment of the invention where the separating vessel used for recovering non-floating bitumen is a PSV and the feed stream is diluted oil sand slurry.

FIG. 3 shows another embodiment of the present invention. In this embodiment, the settling vessel is PSV 310, which has been retrofitted with downpipe assembly 331. Diluted oil sand slurry is fed into PSV 310 via feedwell 328. The diluted slurry is temporarily retained under quiescent conditions to produce an overflowing primary bitumen froth stream ("PSV Froth"), a middlings stream recovered from the midsection of the PSV 310 ("PSV middlings"), and an underflow sand tailings stream ("PSV tailings").

PSV froth overflows into launder 316 and is collected for further upgrading. PSV tailings are continuously removed for further treatment or disposal in suitable tailings disposal sites. The PSV middlings, however, are continuously removed via withdrawal line 318 and recycled back to downpipe assembly 331. Downpipe assembly 331 comprises nozzle 334 and downpipe 332. The upper end 336 of downpipe 332 further comprises air inlet 333. The PSV middlings flow through the nozzle 334 causing a jet 337 to issue in a downward path into downpipe 332. The jet 337 of middlings issuing from the nozzle 334 sheers and then freely entrains air through the open ended air inlet 333.

The jet 337 and air entrained with it are forced together in the limited volume of the downpipe 332 which creates a mixing zone 339. The aerated PSV middlings exit from the open lower end 338 into PSV 310.

FIG. 4 shows one embodiment of a separating vessel equipped with a downpipe assembly that can be used to practice the present invention. Settling vessel 450 comprises launder 416 for collecting the overflowing bitumen froth, middlings outlet 454 for removing middlings, and tailings outlet (not shown) for removing the solids that settle to the bottom of the settling vessel. Middlings that are removed via middlings outlet 454 and are recycled via feed line 455, which splits into smaller feed lines for feeding each individual downpipe 432 of downpipe assembly 431. A slurry distributor (not shown) could also be used to distribute the middlings to the downpipes. Middlings are introduced into nozzles 434 to produce a jet of middlings in each downpipe 432. Air is naturally entrained through air inlets 434 and into each downpipe where the high sheer rate of the plunging jet results in the entrained layer of air being broken down into a multitude of small air bubbles, typically of about 500 μm diameter, which are carried down the downpipe 432.

FIG. 5 is a cross-section of one embodiment of a downpipe useful in the present invention. Downpipe 432 comprises an upper end 436, which end is in fluid communication with nozzle 434. Nozzle 434 ends in orifice 446 for accelerating the feed stream and producing a feed stream jet 437 in downpipe 432. The feed stream jet 437 entrains air 435 from air inlet 433 and shears the air into a multitude of smaller air bubbles. The jet 437 and entrained air are forced together in the limited volume of the downpipe 432 to create mixing zone 439.

EXAMPLES

The present invention was tested using a separating vessel similar to the TORV that is currently being used in the applicant's oil sands operations as a secondary gravity settling tank. Three TORV operating conditions were tested:

(1) TORV operating as a simple gravity settler;

(2) direct air injection into the TORV feed stream; and (3) using a downpipe assembly mounted to the TORV for aerating TORV middlings.

Preparation of the Feed Stream

Two grades of oil sand were tested, a low-grade ore (9.6% bitumen, 21% fines) and a poor processing ore (8.9% bitumen, 24% fines). Generally, an ore such as the poor processing ore having such low bitumen (8.9%) and high fines (24%) would not be used commercially without blending it with higher grade ores. However, if recovery of bitumen can be sufficiently increased practicing the present invention, processing of such poor grade oil sand may be more economically viable.

Each ore sample was first mixed with hot water and NaOH in a tumbler with a zero discharge weir height for minimum residence time. The oversize rejects were removed using a trommel screen (¼ inch woven wire mesh) at the discharge end of the tumbler. The oil sand slurry passed through the screens into a mixing tank, and was pumped into a 100 mm diameter pipeline loop for oil sand slurry conditioning. The conditioned slurry was removed through a slipstream off the pipeline loop.

Flood water was added to the conditioned slurry as it was fed to a primary separation vessel (PSV), but no air was added to the slurry. Froth underwash water was introduced to the PSV in the vicinity below the froth layer. PSV middlings were withdrawn at 300 g/s and the PSV tailings flow rate controlled the froth interface level. The PSV middlings and PSV tailings were combined and used as the TORV feed stream. About 90% of the total bitumen reported to the primary froth layer. Thus, about 10% bitumen still remained in the TORV feed stream. Of the bitumen present in the TORV feed stream, it was estimated that about 41% of the bitumen was floating (i.e., aerated) bitumen.

TORV Operating as a Simple Gravity Settler

The TORV was operated as a simple tank to provide additional passive bitumen recovery. PSV middlings and tailings were used as feed and the TORV middlings were discharged at a rate of 200 g/s. The TORV tailings removal rate controlled the bitumen froth interface level. The % bitumen recovered in the TORV was measured.

TORV With Direct Air Addition to the Feed Stream

Air was added to the PSV middlings and the PSV tailings as separate streams using perforated inline pipe sections for the air addition. The two aerated streams were then combined prior to feeding the combined stream to the feedwell of the TORV. The TORV middlings were discharged at a rate of 200 g/s. The TORV tailings removal rate controlled the bitumen froth interface level. The % bitumen recovered in the TORV was measured.

TORV With Downpipe Assembly

In this instance, the TORV was further equipped with a downpipe assembly of the present invention. The feed stream was introduced into the TORV via the feedwell and the TORV middlings were removed and fed to the downpipe assembly to provide the TORV middlings with further aeration. The TORV tailings removal rate controlled the bitumen froth interface level and the % bitumen recovered in the TORV was measured.

Table 1 shows the % recovery of bitumen from TORV feed stream using low-grade ore under the above three conditions. In this example, the PSV recovery of bitumen was about 90% and it was estimated that 41% of the bitumen in the TORV feed stream was in the form of floating bitumen.

TABLE 1

| TORV Operation | Simple Tank | Air Injection | TORV + Downpipe Assembly |
|---|---|---|---|
| TORV Recovery | 43% | <43% | 56% |
| Increment in TORV Recovery Compared to Simple Tank | | | +13% |
| Increment in Extraction Recovery Compared to the Simple Tank | | | +1% |

The incremental increase in overall bitumen recovery of 1% would amount to significant commercial value. In current operations, this would amount to an additional 1.5 million barrels of bitumen per year.

Table 2 shows the % recovery of bitumen from TORV feed stream using poor processing ore under the above three conditions. In this example, the PSV recovery of bitumen was only about 30% and it was estimated that only 14% of the bitumen in the TORV feed stream was in the form of floating bitumen.

TABLE 2

| TORV Operation | Simple Tank | Air Injection | TORV + Downpipe Assembly |
|---|---|---|---|
| TORV Recovery | 15% | 27% | 51% |
| Increment in TORV Recovery Compared to Simple Tank | | | +36% |
| Increment in Extraction Recovery Compared to the Simple Tank | | | +15% |

It can be seen from this example that use of the present invention resulted in a recovery of almost half of the non-floating bitumen present in the feed stream. The incremental increase in overall bitumen of 15% indicates that poor processing ore may be a viable source of bitumen when using the present invention for secondary bitumen recovery.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention.

Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims.

We claim:

1. A method for continuously recovering bitumen as froth from a feed stream having solids, water and bitumen, comprising:

(a) delivering the feed stream into a separating vessel through a feedwell and allowing the feed stream to separate into an upper bitumen-rich zone, a middlings zone and a lower concentrated solids zone;

(b) providing a downpipe assembly comprising at least one downpipe having an upper end and an open lower end, said downpipe assembly mounted to the separation vessel such that each downpipe extends substantially vertically into the separation vessel and the open lower end of each downpipe extends below the bitumen-rich zone;

(c) removing a stream of middlings from the middlings zone of the separation vessel and introducing the middlings stream into a nozzle positioned at or near the upper end of each downpipe and in fluid communication with the downpipe to form a jet of middlings;

(d) introducing air into the middlings stream to produce aerated middlings and allowing the aerated middlings to issue from the open lower end of each downpipe below the bitumen-rich zone of the separation vessel; and (e) continuously recovering the bitumen froth from the upper bitumen-rich zone and withdrawing the solids from the lower concentrated solids zone in the separation vessel.

2. The method as claimed in claim 1, wherein the air is introduced into the middlings through an opening at or near the upper end of the downpipe.

3. The method as claimed in claim 1, wherein the air is introduced into the middlings stream prior to introducing the middlings stream into the nozzle.

4. The method as claimed in claim 1, wherein the nozzle comprises an orifice having a diameter greater than about 3 inches but less than about 6 inches.

5. The method as claimed in claim 1, wherein the separating vessel is a primary separation vessel and the feed stream is diluted oil sand slurry.

6. The method as claimed in claim 1, wherein the separating vessel is a secondary separation vessel and the feed stream is PSV middlings or combined PSV middlings and PSV tailings.

7. The method as claimed in claim 1, wherein the middlings stream is introduced into each downpipe at a velocity of about 5 to 10 meters/second.

8. The method as claimed in claim 1, wherein the middlings stream is introduced into each downpipe at a velocity of less than about 5 meters/second.

* * * * *